May 29, 1934.　　　　J. W. WEST　　　　1,960,934
CARRIER HOLDER DEVICE
Filed Oct. 10, 1932　　　2 Sheets-Sheet 1
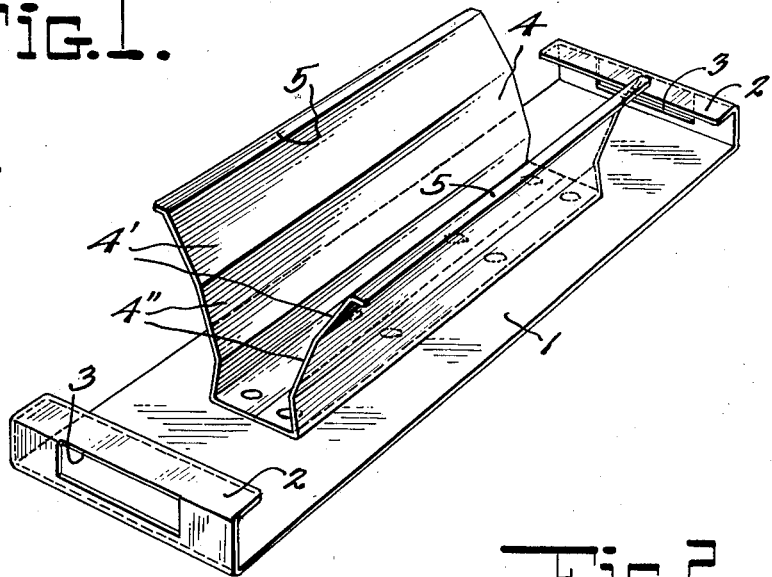
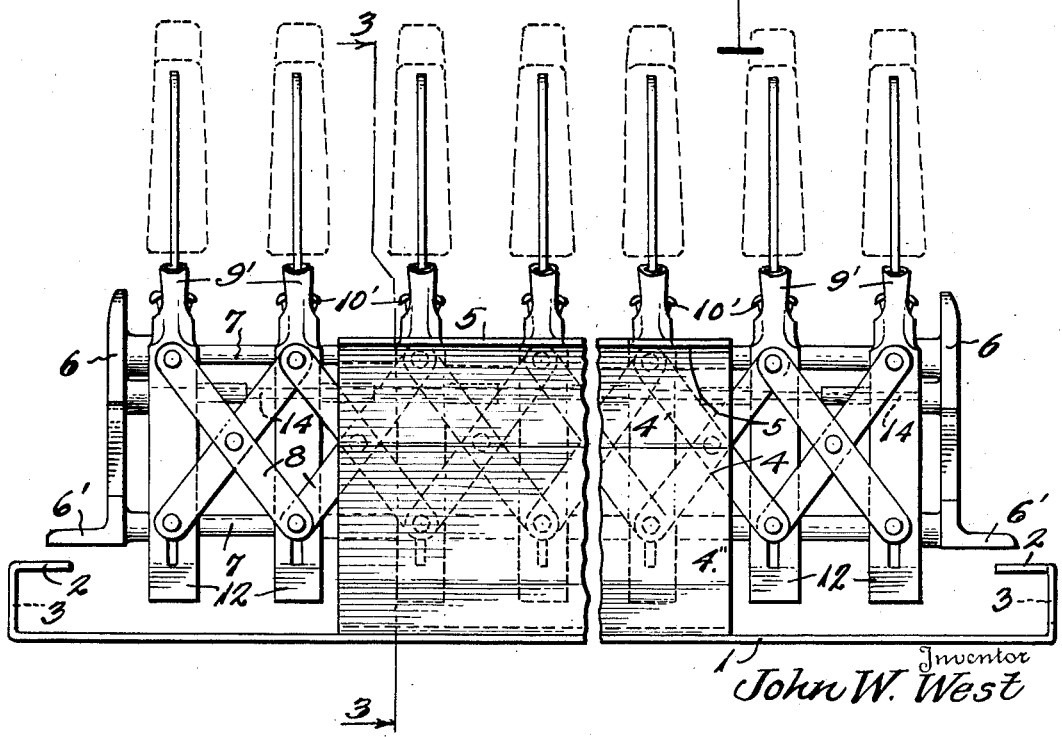
Inventor
John W. West
By Robb & Robb
Attorneys

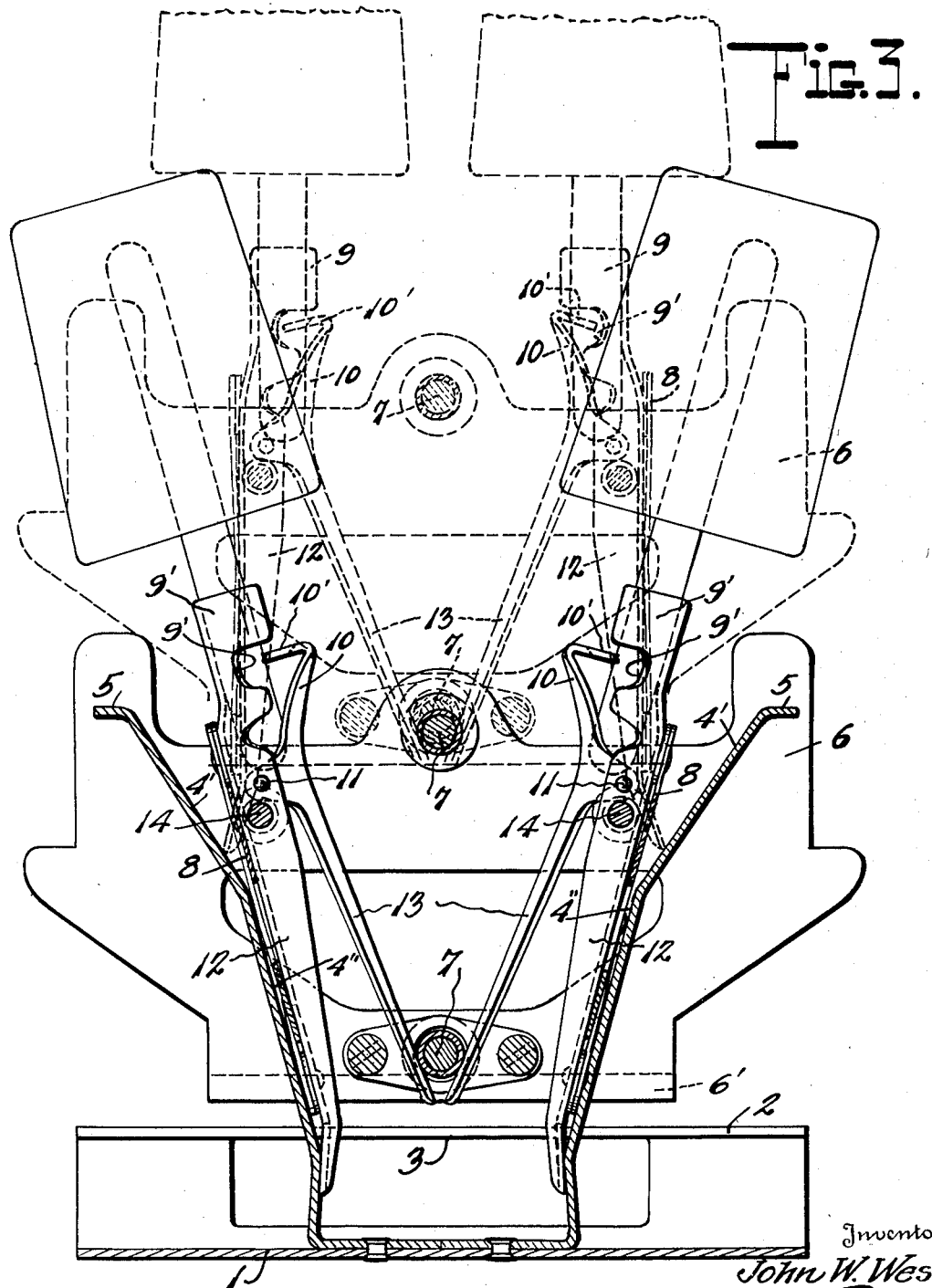

Patented May 29, 1934

1,960,934

UNITED STATES PATENT OFFICE 1,960,934

CARRIER-HOLDER DEVICE

John W. West, New York, N. Y., assignor, by mesne assignments, to Good Humor Corporation of America Application October 10, 1932, Serial No. 637,193

3 Claims. (Cl. 107—8)

The present invention has reference to the art of handling stick confections and in particular to a unit for holding and carrying a gripper device used in the operation of coating the confections.

In the process of manufacturing confections of the type herein comprehended at the present time, individual blocks or pieces of ice cream are molded in suitable molds, or more strictly speaking the cream is frozen in the molds together with a handle or stick which is embedded in the center to a predetermined distance. These sticks are centered and held in proper position within the molds by a gripper device which functions additionally to support the molded confections while they are dipped in coating substances and while the wrappers are applied to them subsequently. Such an arrangement is more particularly described and claimed in my copending application Serial No. 637,194 filed of even date herewith for which reason no claims are herein made for the gripper device or its combination with the carrier holder forming the subject matter of the present application.

The object of this invention is to provide a simple structure which will serve to support the gripper device referred to while the sticks are inserted in the gripping means thereof, and while the wrappers are applied after coating. To this end, the device is formed with a supporting element so shaped that when the gripper device is disposed therein the gripping elements thereof will be automatically opened to receive the sticks when filling the device, or to release the same after the coating and wrapping operations.

Other and further objects and advantages of the invention will be hereinafter set forth and the novel features thereof defined by the appended claims.

In the drawings:

Fig. 1 is a perspective view of an embodiment of the invention;

Fig. 2 is a side elevation showing the gripper device in co-acting position in the holder; and Fig. 3 is an enlarged transverse sectional view on the line 3—3 of Fig. 2.

Like numerals refer to like parts in the several figures of the drawings.

Referring to the drawings and particularly to Fig. 1, the invention comprises an elongated base plate 1 having its ends bent upwardly and back horizontally to form a handle and stop 2 at each end, the material being stamped out as at 3 to provide a hand-hold or grip.

Centrally secured to this base plate and extending longitudinally thereof is an open-ended trough-like support 4, fastened to the plate in any suitable manner. The side walls of this support are flared outwardly so as to form camming surfaces 4 and 4', while the upper edges are flanged outwardly as at 5. The length of this trough member conforms preferably, though not necessarily, to the length of the gripper device to be introduced therein, when the said device is in its collapsed condition, and the width of the member is somewhat narrower than the extremes of the gripper handles of opposing pairs for reasons to be explained hereinafter.

In order to understand the purpose of this invention, the gripper devices with which it is used will be briefly explained. This device comprises a frame composed of the end pieces 6 which are connected by the upper and lower telescoping bars 7 which enable the side pieces to be adjusted toward or from each other as herein-after more fully explained. The end pieces 6 are formed with laterally extending flanges 6' by means of which the gripper device may be handled.

Mounted at opposite sides of the central rods 7 are a series of gripping members arranged in pairs and connected to the respective lazy-tongs 8. Each of these gripper devices is formed with coacting gripping jaws, one designated 9, U-shaped in cross section and notched as at 9', and the other, designated 10, angularly bent as at 10'. These jaws are pivotally connected at 11 and formed with handle members 12 and 13 respectively. The handle member 13 normally bears against the lower rod 7 and the handle member 12 is held in spaced relation thereto by a spring, not shown, coiled about the pivot 11. This holds the jaws together in gripping relation. Supporting members or telescoping rods 14 pass through the handles 12 of the respective sets of gripping devices thereby maintaining said devices in horizontal alignment during the expansion or contraction of the lazy-tongs in the use of this device. It will be understood that any number of these gripping devices may be employed depending upon the molds with which the device is used, there being a gripping device for each mold by means of which a stick is held in proper position in the mold during the freezing operation. Since these gripping devices are expansible by reason of the lazy-tong structure and telescoping connecting rods described, the confections may be spaced apart after the sticks have been inserted into the grippers to facilitate the coating of the confection and the application of the wrappers thereto. In the use of this device, the sticks are inserted into the gripper members by inverting the device so that the jaws are presented upwardly. The unit is then disposed over the trough member 4 in which position the handles 12 will contact with the side walls 4. By pressing the unit downwardly the distance between the extremities of the handles 12 of each set of gripping devices will be reduced causing the gripping jaws to be opened to the fullest extent when the unit has been moved home to the position shown in Fig. 2 of the drawings. The introduction of the gripper device into the holder as aforesaid is facilitated by engaging the fingers through the openings 3 in the base plate handles and pressing downwardly with the thumb upon the flanges 6' of the ends 6 of the gripper device. When the jaws are in the open position above described the sticks are dropped into place. Upon removal of the gripper device from the holder all of the sticks will be simultaneously gripped and securely held. The gripper device is then positioned over the mold with the sticks inserted thereinto as shown and described in my copending application above referred to.

After the ice cream has been frozen upon the sticks and the molds introduced into warm water to release the confections from the walls of the molds the gripper device is elevated, thereby raising all of the confections from the molds, whereupon as shown in Fig. 3 in dotted lines the mold device is again disposed in position to be pressed into the trough member 4 of the holder. When moved downwardly the sticks of the confections are released and the wrappers or envelopes may readily be slipped over the confections while in this inverted position and the individual confections removed from the holder by displacing them from the gripping devices. It will be obvious, however, that the gripping device and the holder unit may be inverted together so as to displace all of the confections from the gripping device at one time.

It will also be understood that the gripping device may be expanded while it is in the holder so as to space the confections apart for applying the wrappers, under which conditions the handles 2 will constitute stops for limiting the expansion of the lazy-tongs, or it may be so expanded preliminary to introduction into the holder.

Insofar as the invention of the present application is concerned, it will be understood that a very cheap holding device is provided by forming the same of metal or any other suitable material and that said holder will also function to simultaneously open the gangs of gripping members in the gripping device.

Having thus described my invention what I claim as new and desire to secure by Letters Patent is:—

1. A fixture for manipulating and holding a multiplicity of stick gripping devices, consisting of a trough like member, the upper portion of which comprises guides for guiding the gripping devices towards the lower portions, and a lower portion comprising a holder for the gripping devices in stick receiving and discharging condition, said trough like member being mounted upon a base provided with handles by means of which it may be inverted.

2. A fixture for manipulating and holding a longitudinally expandible multiple stick gripping device of the class described, comprising a trough-like member having an upper portion for guiding the gripping device towards the bottom and for causing all of the gripping jaws thereof to simultaneously open, said trough-like member also having a lower portion for holding the gripping device in such open jaw position and being mounted upon a base provided with a stop member beyond each end of the trough-like member for limiting the extent to which the stick gripping device can be expanded when held in the fixture.

3. A fixture for manipulating and holding a longitudinally expandible multiple stick gripping device of the class described, comprising a trough-like member having an upper portion for guiding the gripping device towards the bottom and for causing all of the gripping jaws thereof to simultaneously open, said trough-like member also having a lower portion for holding the gripping device in such open jaw position and being mounted upon a base provided with a combined stop and handle member beyond each end of said trough-like member for limiting the extent to which the stick gripping device can be expanded when held in the fixture and for inverting it to discharge the sticks.

JOHN W. WEST.